(12) United States Patent
Hasegawa et al.

(10) Patent No.: US 6,208,330 B1
(45) Date of Patent: Mar. 27, 2001

(54) COORDINATE INPUT APPARATUS AND ITS CONTROL METHOD

(75) Inventors: Masahide Hasegawa, Yokohama; Shoichi Ibaraki, Tokyo; Masahiro Ando, Yokohama, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/037,131

(22) Filed: Mar. 9, 1998

(30) Foreign Application Priority Data

Mar. 7, 1997 (JP) .................................................. 9-053141

(51) Int. Cl.[7] .................................................. G09G 5/00
(52) U.S. Cl. .......................... 345/173; 345/175; 345/177; 345/179; 178/18.01; 178/18.04; 178/19.01; 178/19.05
(58) Field of Search ..................................... 345/173, 175, 345/177, 179, 180–183; 178/180.1, 18.04, 18.09, 19.01–19.05

(56) References Cited

U.S. PATENT DOCUMENTS

| 4,686,332 | * | 8/1987 | Greanias et al. | 178/19 |
|---|---|---|---|---|
| 4,746,770 | * | 5/1988 | McAvinney | 178/18 |
| 4,782,328 | * | 11/1988 | Denlinger . | |
| 5,386,219 | * | 1/1995 | Greanias et al. | 345/174 |
| 5,565,658 | * | 10/1996 | Gerpheide et al. | 178/19 |
| 5,708,461 | * | 1/1998 | Kent | 345/177 |
| 5,717,432 | * | 2/1998 | Miwa et al. | 345/173 |
| 5,760,346 | * | 6/1998 | Kobayashi et al. | 178/18 |
| 5,854,450 | * | 12/1998 | Kent | 178/18.04 |
| 5,861,874 | * | 1/1999 | Joto | 345/173 |
| 6,091,406 | * | 7/2000 | Kambara et al. | 345/177 |

* cited by examiner

*Primary Examiner*—Richard A. Hjerpe
*Assistant Examiner*—Henry N. Tran
(74) *Attorney, Agent, or Firm*—Fitzpatrick, Cella, Harper & Scinto

(57) ABSTRACT

A coordinate input apparatus has an optical scanning/detection unit for touch input, and a vibration sensor for pen input. While no coordinate input is made, some components of the optical scanning/detection unit are activated to detect the size of an object that approaches or contacts an input board. When the detected size is smaller than a predetermined value (as large as about the fingertip), it is determined that touch input has been made, and the optical scanning/detection unit is activated to acquire the coordinate value of the touch input. On the other hand, when the detected size is larger than the predetermined value (larger than a fist), it is determined that pen input has been made, and coordinate detection using the vibration sensor is done.

39 Claims, 8 Drawing Sheets

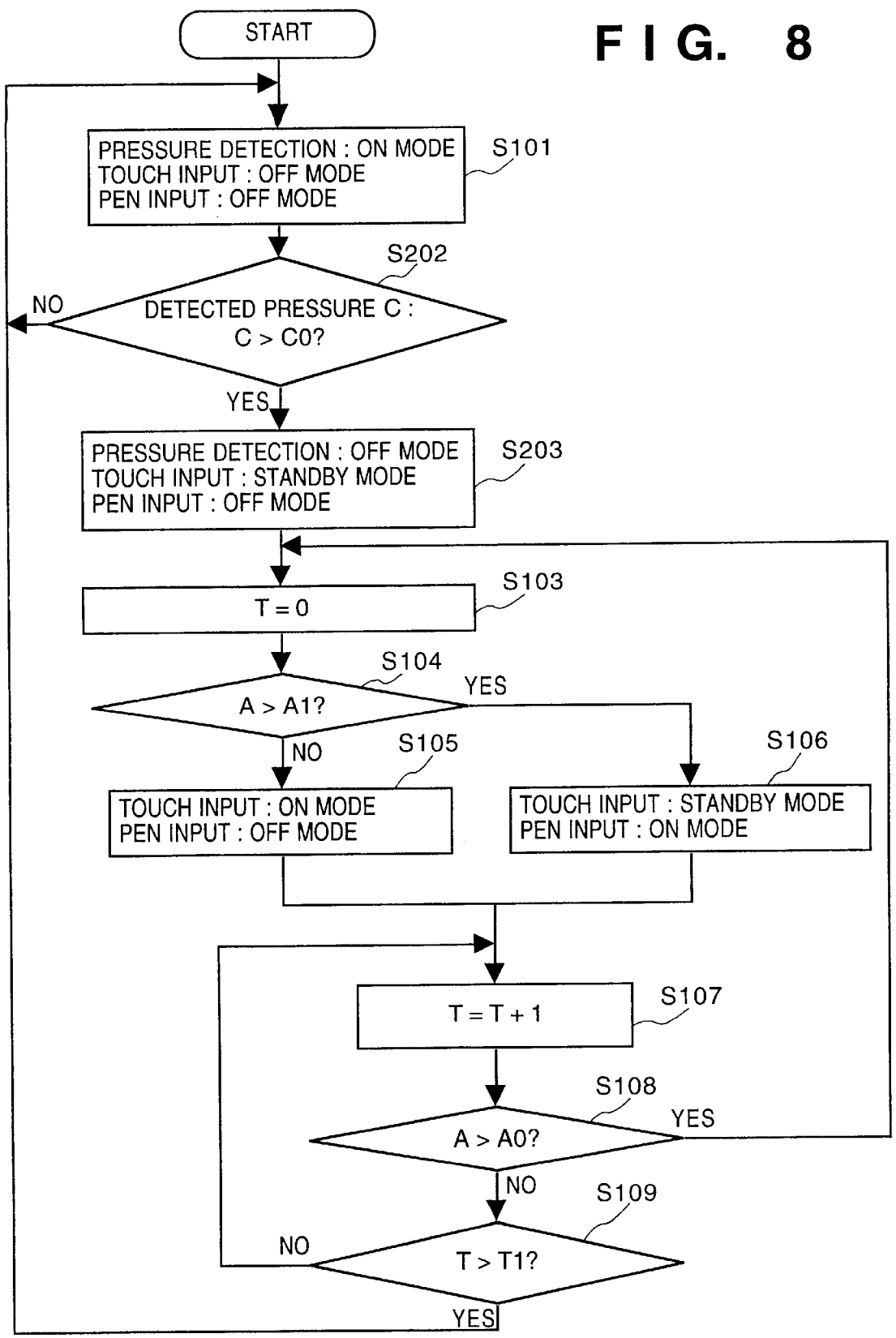

COORDINATE INPUT APPARATUS AND ITS CONTROL METHOD

BACKGROUND OF THE INVENTION

The present invention relates to a coordinate input apparatus for detecting the position pointed on the coordinate input surface and inputting the detected coordinate value, and its control method.

In general, a coordinate input apparatus can be roughly classified into two types, i.e., a touch panel with which the user directly makes operation input on the input surface using his or her finger, and a digitizer with which the user makes coordinate input on the input surface by operating a tool such as a pen or the like. The digitizer does not normally allow direct input operation with the finger. On the other hand, the touch panel also allows input operation using an input pointer such as a pen or the like (the input pointer used for the digitizer will be generally referred to as a pen hereinafter). Hence, the touch panel is convenient: simple input operation can be done by directly pointing the input surface with the finger, and precise input operation of characters, graphics, and the like can be done by the pen.

However, when the user makes input operation on the touch panel by operating a tool such as a pen or the like, if his or her hand touches the input surface, the touched portion is unwantedly detected as the pointed position, resulting in operation errors. Also, in case of, e.g., an optical type apparatus that detects the pointed input not only when an object contacts but when it approaches, for example, an original placed on the input surface is detected as the pointed input, thus producing input errors. Especially, since display devices tend to have larger screens (i.e., larger input surfaces), the above-mentioned problems can no longer be ignored.

The input operation by the finger or the like need be done by a light operation force although low resolution is allowed (such input operation will be referred to as a touch input hereinafter). By contrast, the input operation using a pen can have a certain writing pressure but requires high resolution (such input operation will be referred to as a pen input hereinafter) Especially, character recognition requires very high resolution. It is very difficult to simultaneously meet these two antithetic requirements. Especially, as for the resolution, the same applies not only to spatial resolution but also to temporal resolution, and the specification difference required for touch and pen inputs is very large. Hence, it is nearly impossible to satisfy these requirements by a single detection method.

In recent years, energy savings are required for information processing apparatuses, and it is getting harder to attain energy savings and higher resolution.

SUMMARY OF THE INVENTION

The present invention has been made in consideration of the above-mentioned problems, and has as its object to provide a coordinate input apparatus which can satisfy requirements for touch and pen inputs, and its control method.

It is another object of the present invention to provide a coordinate input apparatus which allows the user to make both touch input capable of light input operation, and pen input capable of precise input operation, and to perform stable touch and pen inputs, and its control method.

It is still another object of the present invention to provide a coordinate input apparatus which allows both touch and pen inputs and can attain power savings, and its control method.

In order to achieve the above objects, a coordinate input apparatus according to one aspect of the present invention comprises the following arrangement. That is, a coordinate input apparatus comprises:

first position detection means for detecting a position pointed on an input surface at a first resolution;

second position detection means for detecting the position pointed on the input surface at a second resolution higher than the first resolution;

size detection means for detecting a size of an object that approaches or contacts the input surface; and control means for setting one of the first and second position detection means in an active state capable of pointed position detection on the basis of the size of the object detected by the size detection means.

In order to achieve the above objects, a coordinate input apparatus according to another aspect of the present invention comprises the following arrangement. That is, a coordinate input apparatus comprises:

first position detection means for detecting a position pointed on an input surface at a first resolution;

second position detection means for detecting the position pointed on the input surface at a second resolution higher than the first resolution;

pressure detection means for detecting a contact pressure acting on the input surface;

size detection means for, when the contact pressure detected by the pressure detection means is higher than a predetermined pressure, detecting a size of an object on the input surface; and control means for setting one of the first and second position detection means in an active state for detecting the pointed position on the basis of the size of the object detected by the size detection means.

In order to achieve the above objects, a control method for a coordinate input apparatus according to still another aspect of the present invention comprises the following steps. That is, a control method for a coordinate input apparatus which comprises first position detection means for detecting a position pointed on an input surface at a first resolution, and second position detection means for detecting the position pointed on the input surface at a second resolution higher than the first resolution, comprises:

the size detection step of detecting a size of an object that approaches or contacts the input surface; and the control step of setting one of the first and second position detection means in an active state capable of pointed position detection on the basis of the size of the object detected in the size detection step.

In order to achieve the above objects, a control method for a coordinate input apparatus according to yet another aspect of the present invention comprises the following steps. That is, a control method for a coordinate input apparatus which comprises first position detection means for detecting a position pointed on an input surface at a first resolution, and second position detection means for detecting the position pointed on the input surface at a second resolution higher than the first resolution, comprises:

the pressure detection step of detecting a contact pressure acting on the input surface;

the size detection step of detecting a size of an object on the input surface when the contact pressure detected in the pressure detection step is higher than a predetermined pressure; and the control step of setting one of the first and second position detection means in an active state for detecting the pointed position on the basis of the size of the object detected in the size detection step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a flow chart for explaining the operation sequence of the coordinate input apparatus according to the second embodiment.

DETAILED DESCRIPTION OF THE PREFERRED EMBODIMENTS

Preferred embodiments of the present invention will now be described in detail in accordance with the accompanying drawings.

<First Embodiment>

Figure 1:
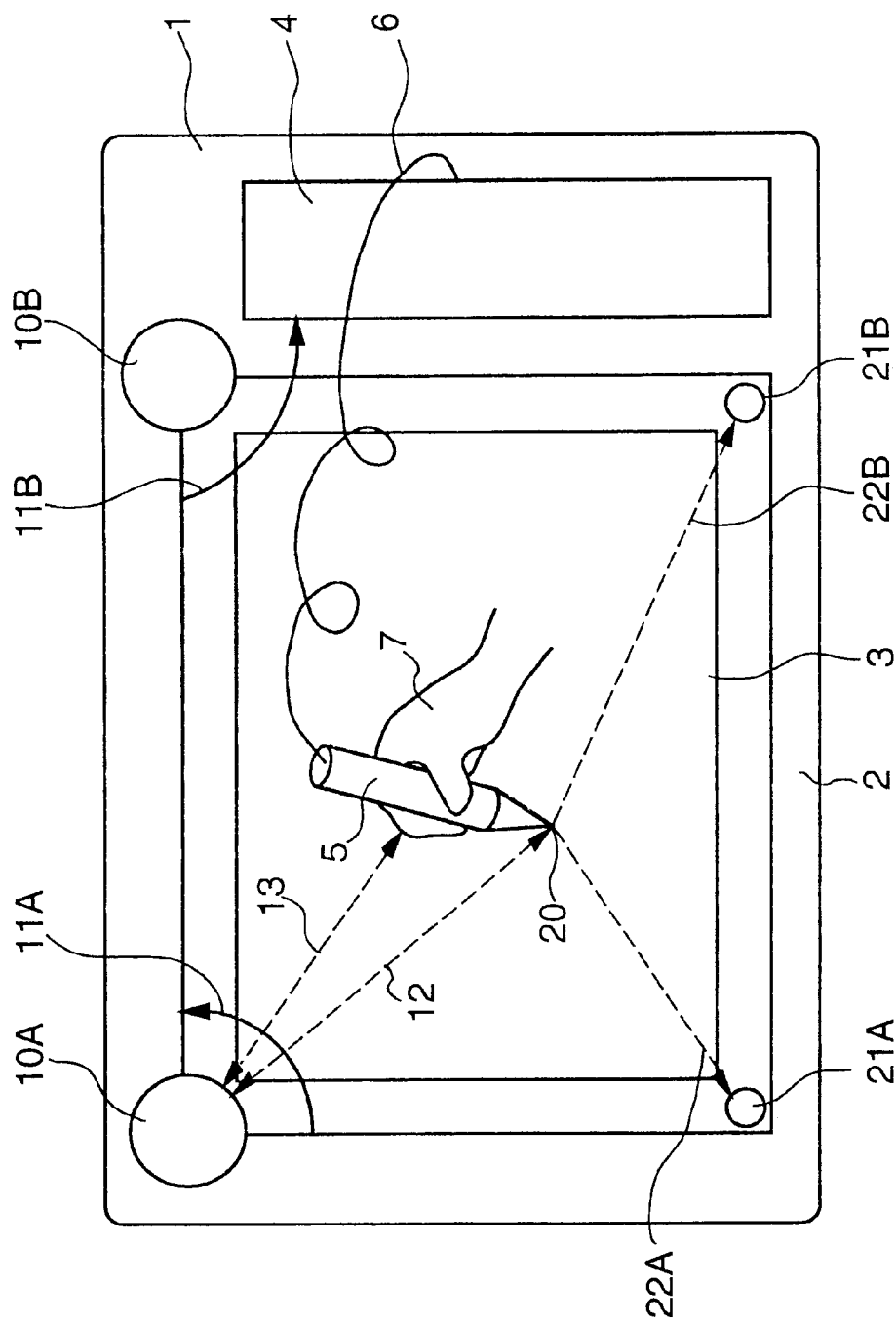
FIG. 1 is a schematic plan view showing the outer appearance of a coordinate input apparatus according to the first embodiment of the present invention.

FIG. 1 shows the outer appearance of a coordinate input apparatus according to the first embodiment. In FIG. 1, reference numeral 1 denotes the overall coordinate input apparatus. Reference numeral 2 denotes an input board which serves as a coordinate input surface of the coordinate input apparatus 1. Reference numeral 3 denotes an input area which allows coordinate input on the input board 2. Reference numeral 4 denotes a control circuit which executes various kinds of control of the coordinate input apparatus 1. Note that the control circuit 4 will be explained in detail later.

Reference numeral 5 denotes a pen, which is connected to the control circuit 4 via a cable 6. Reference numerals 10A and 10B denote optical scanning/detection units which respectively scan infrared ray beams indicated by arrows 12 and 13 several mm above the surface of the input board 2 in the directions of arrows 11A and 11B, and detect the reflected light beams. The optical scanning/detection units 10A and 10B can obtain the directions or ranges of an approaching object above the input area 3, and the coordinate value can be obtained based on the intersection between the two directions or ranges.

Reference numeral 20 denotes a tip portion of the pen 5. The tip portion 20 has a function as an ultrasonic wave emitter. Reference numerals 21A and 21B denote vibration sensors which detect vibrations (ultrasonic wave pulses emitted by the tip portion 20) traveling on the input board 2. When the tip portion 20 emits an ultrasonic wave while it contacts the input board 2, the ultrasonic wave pulses emitted by the tip portion 20 travel on the input board 2, and reach the vibration sensors 21A and 21B with delay times proportional to the distance they traveled. The pen input position and the distances to the sensors are obtained based on the pulse detection times of the vibration sensors 21A and 21B, and the input coordinate point is determined from these two distances.

Figure 2:
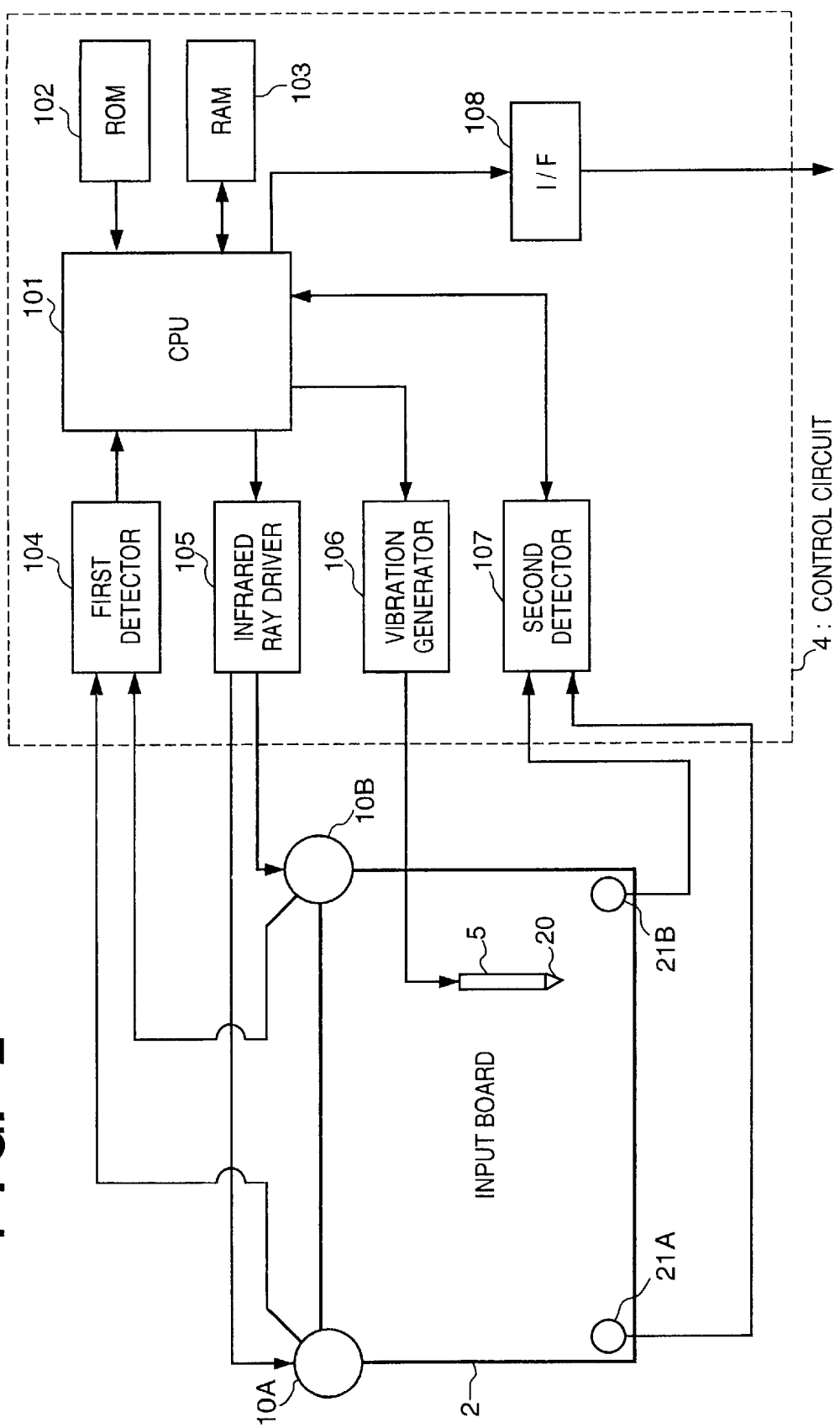
FIG. 2 is a block diagram showing the arrangement of a control circuit 4 according to the first embodiment.

FIG. 2 is a block diagram showing the arrangement of the control circuit 4 according to the first embodiment. In FIG. 2, reference numeral 101 denotes a CPU for realizing various kinds of control in accordance with a control program stored in a ROM 102. Reference numeral 102 denotes a ROM which stores the control program to be executed by the CPU 101, and various data. Reference numeral 103 denotes a RAM which provides a work area used when the CPU 101 executes various kinds of control.

Reference numeral 104 denotes a first detector for generating an object detection signal by the optical scanning/detection unit 10A and 10B. Reference numeral 105 denotes an infrared ray driver for driving the optical scanning/detection units 10A and 10B to scan infrared ray beams. The CPU 101 detects the position (coordinate value) of an object on the input board 2 on the basis of the scanning timings of the infrared ray beams by the infrared ray driver 105 and the timing of the object detection signal from the first detector 104.

Reference numeral 106 denotes a vibration generator for driving the tip portion 20 of the pen 5 to emit ultrasonic wave pulses. Reference numeral 107 denotes a second detector for detecting the arrivals of ultrasonic wave pulses on the basis of the detection signals from the vibration sensors 21A and 21B. The CPU 101 makes the tip portion 20 emit ultrasonic wave pulses via the vibration generator 106, and calculates the coordinate value by measuring the time difference from when the ultrasonic wave pulses are emitted until the ultrasonic wave pulses are detected by the second detector 107.

Figure 3:
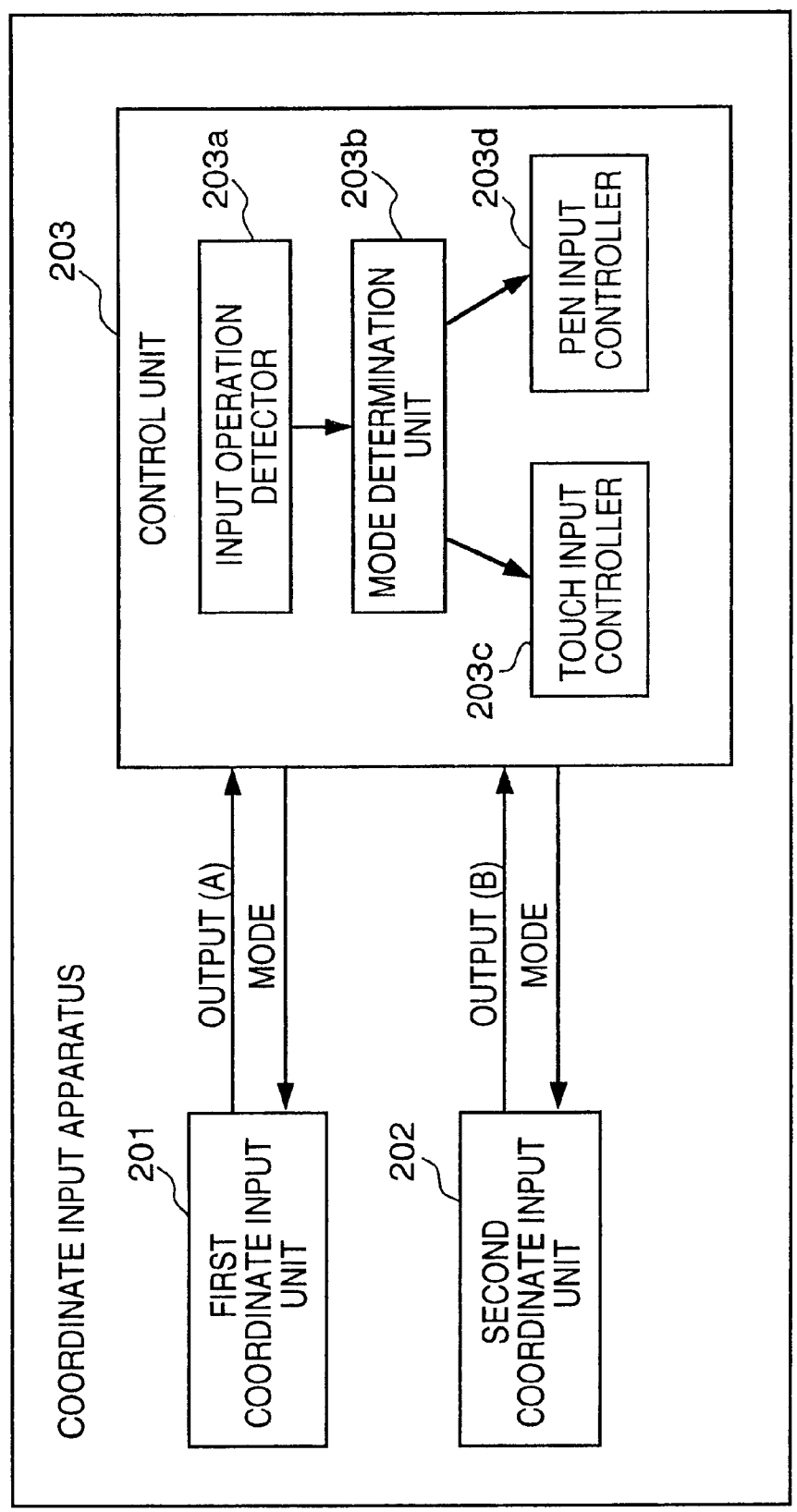
FIG. 3 is a block diagram for explaining the functional arrangement of the coordinate input apparatus according to the first embodiment.

FIG. 3 is a block diagram for explaining the functional arrangement of the coordinate input apparatus according to the first embodiment. Reference numeral 201 denotes a first coordinate input unit which performs detection for a touch input. In this embodiment, the first coordinate input unit 201 is constituted by the optical scanning/detection units 10A and 10B, first detector 104, and infrared ray driver 105. Reference numeral 202 denotes a second coordinate input unit which performs detection for a pen input. In this embodiment, the second coordinate input unit 202 is constituted by the input board 2, vibration sensors 21A and 21B, pen 5, vibration generator 106, and second detector 107.

Reference numeral 203 denotes a control unit as a function implemented by the control of the CPU 101. The control unit 203 comprises an input operation detector 203a, mode determination unit 203b, touch input controller 203c, and pen input controller 203d. The input operation detector 203a drives one optical scanning/detection unit in the first coordinate input unit, and detects start of input operation on the basis of the detection signal of an approaching object on the input area 3. The mode determination unit 203b detects a touch input by the fingertip or the like, or a touch input in the pen holding state on the basis of the size of the approaching object detected by the input operation detector 203a, and determines the operation mode. More specifically, when a touch input made by the fingertip is detected, the mode determination unit 203b activates the touch input controller 203c to execute coordinate input processing so as to operate as a touch panel. On the other hand, when a touch input in the pen holding state (e.g., the detected size of touch input is larger than a fist) is detected, the mode determination unit 203b activates the pen input controller 203d to execute coordinate input processing.

The touch input controller 203c calculates the coordinate value on the basis of the detection signal from the first detector 104, and externally outputs the obtained coordinate value via an interface 108.

Figure 4:
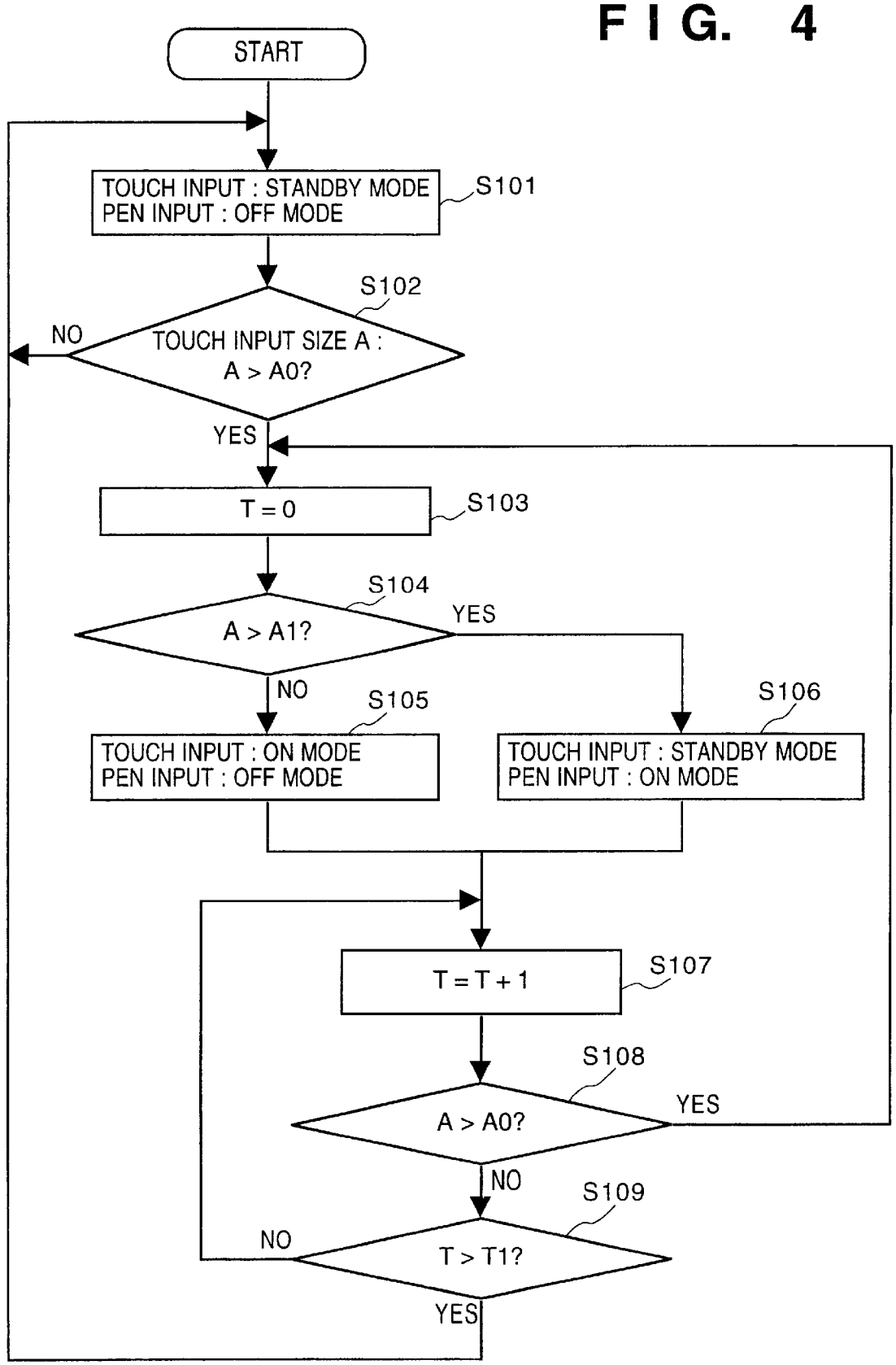
FIG. 4 is a flow chart for explaining the operation sequence of the coordinate input apparatus according to the first embodiment.

The operation sequence of the coordinate input apparatus of the first embodiment with the above arrangement will be described in more detail below with reference to the flow chart in FIG. 4. FIG. 4 is a flow chart for explaining the operation sequence of the coordinate input apparatus according to the first embodiment. The control program that implements the processing shown in FIG. 4 is stored in the ROM 102, and is executed by the CPU 101.

If there is no approaching object above the input area 3 on the input board 2, touch input is set in a standby mode, and pen input is set in an OFF mode (step S101). In the standby mode of touch input, one of the two optical scanning/detection units 10A and 10B operates, and the other one halts. More specifically, when the CPU 101 supplies a mode signal indicating the standby mode to the infrared ray driver 105, the driver 105 activates the optical scanning/detection unit 10A and deactivates the optical scanning/detection unit 10B. For this reason, power savings of the apparatus can be attained in the standby mode.

In this state, when the optical scanning/detection unit 10A detects an approaching object above the input area 3, it is checked based on the size of the approaching object (the size of the detection area) if it is about to make a coordinate input. In this embodiment, it is checked in step S102 if a size A of the approaching object is larger than A0. If the size A is larger than A0, the flow advances to step S103 to execute coordinate input processing.

The optical scanning/detection unit 10A detects reflection light from the object, and recognizes a size of the object based on time period of detecting the reflection light. Further, rough distance between the optical scanning/detection unit 10A and the object can be obtained in accordance with intensity of the reflection light. Preciseness of discrimination of a fingertip or a fist is enhanced by considering a distance between the optical scanning/detection unit 10A and the object.

In step S103, a count value T of a counter for forming a time difference from when no approaching object is detected until mode switching is done (processing contents will be described later) is reset to zero. It is then checked in step S104 if the size A of the approaching object is larger than A1, and the coordinate input mode is determined based on the checking result. More specifically, if A>A1 does not hold, the flow advances to step S105 to set touch input in an ON mode and pen input in the OFF mode so as to execute coordinate input processing by the touch input controller 203c. That is, both the scanning/detection units 10A and 10B are activated to make coordinate detection by touch input. On the other hand, if A>A1 holds, the flow advances to step S106 to set touch input in the standby mode and pen input in the ON mode so as to execute coordinate input processing by the pen input controller 203d.

For example, when the operator makes his or her hand 7 holding the pen 5 approach the input area 3, a signal having a magnitude ranging from the arrow 12 to arrow 13 appears as an output A of the optical scanning/detection unit 10A. The output A is compared with a predetermined magnitude A0. The magnitude of A0 is set in correspondence with, e.g., the size of the fingertip. If A is larger than A0, A is compared with another predetermined magnitude A1. The magnitude of A1 is set in correspondence with, e.g., the size of the fist. If A is larger than A1, it is determined that the pen input is about to be made; otherwise, it is determined that touch input is about to be made.

After the mode is determined as described above, the flow advances to step S107. In step S107, the counter T is incremented by 1. It is checked in step S108 if the size of the approaching object is larger than A0. If the size of the approaching object is larger than A0, it is determined that another coordinate input is to be made, and the flow returns to step S103. On the other hand, if the state wherein the size A of the approaching object is smaller than A0 has continued for a time T1, it is determined that the coordinate input processing is complete, and the flow returns to step S101 (steps S109 and S107).

As described above, even after the coordinate input mode has been determined in step S104 to S106, the output A from the optical scanning/detection unit 10A is kept monitored, and when the state wherein no approaching object is detected has continued for a predetermined time (T1), the control returns to the initial standby state. Hence, even when the operator instantaneously releases the hand from the input board during pen input, he or she can satisfactorily continue the input. When the operator makes touch input by the finger during, e.g., pen input, since the magnitude of the output A becomes smaller than the predetermined magnitude A1, and A0<A<A1 holds, touch input is automatically switched to the ON mode and pen input is switched to the OFF mode, thus allowing input without any delays. The same applies to switching from touch input to pen input.

According to the above-mentioned control, even when the operator makes an original or coffee cup approach the input surface inadvertently, since the size of the approaching object exceeds A1, the pen input control is activated. For this reason, touch input is not activated, and any wrong coordinate value can be prevented from being output. Especially, since the method of detecting ultrasonic vibrations is used for pen input like in this embodiment, even when the operator makes a coffee cup or the like approach the input surface, he or she can satisfactorily continue pen input.

As described above, according to the first embodiment, the size of an approaching object or contact object is detected in the standby mode of the first coordinate input unit 201, and one of the first and second coordinate input units 201 and 202 is set in the operative mode (ON mode) on the basis of the detection result to output a coordinate value. For this reason, when no input has been made, consumption power of only the first coordinate input unit 201 (driving power of the optical scanning/detection unit 10A alone) is required. This control not only can attain energy savings, but also can prolong the service life of the elements used, thus reducing troubles of the apparatus.

Even when an original or the like approaches the input surface, since the original is larger than the finger, pen input is activated in place of touch input, and any wrong coordinate value can be prevented from being output.

Furthermore, since the size detection of an approaching object and mode switching are always done by the processing in steps S103 to S108, touch input is activated if the operator touches the input area 3 with the finger, or pen input can be done if the operator places the hand with the pen on the input area. More specifically, touch and pen inputs can be automatically selected in accordance with the individual input operations, and the operator can naturally perform both touch and pen inputs, thus providing a coordinate input apparatus with very good operability.

In case where the optical scanning/detection unit has a low mode switching speed such as a scanner, the ON mode is preferably set irrespective of the magnitude of the output A. However, such problems can be solved by various methods, e.g., by setting a motor of the scanner at a slightly low rotational speed in the standby mode. When the rotational speed of the scanner motor is decreased, not only power savings can be attained but also measures against the service life and noise of the scanner motor can be taken.

Since this embodiment need only comprise a touch input mechanism (first coordinate input unit) that can detect the size of an approaching object or contact object, and has the standby mode that can attain power savings and the ON mode that can detect the coordinate point by touch input, various detection methods such as a method using a resistive film, a method using a capacitance, a method using an ultrasonic wave or light, and the like can be used. In order to detect the size using these methods, since one of two X- and Y-detectors need only be activated, the other detection unit can halt to attain power savings. In addition, by lowering the scan rate (when the resistive film, capacitance, or light is used, the scan rate can be lowered by extending the period of scanning the screen surface, this scan rate is lowered; in an ultrasonic wave type apparatus or optical type apparatus using a line sensor, the scan rate can be lowered by extending the drive pulse input periods), power savings can be attained more effectively.

The second coordinate input unit (digitizer) for pen input is not limited to the one using ultrasonic waves, and various other methods maybe used. However, methods that can prevent coordinate input by the pen from being disturbed by the hand touched the input surface must be used. In this respect, the method of measuring distance byultrasonic waves of this embodiment is one of the preferred methods.

As described above, the operator can successively make touch and pen inputs insensible of any extra operations or response drop, and input errors caused by an original placed on the input surface can be prevented. For this reason, very good operability can be guaranteed, and the power saving mode can be set while no input is made, thus attaining energy savings.

<Second Embodiment>

Figure 5:
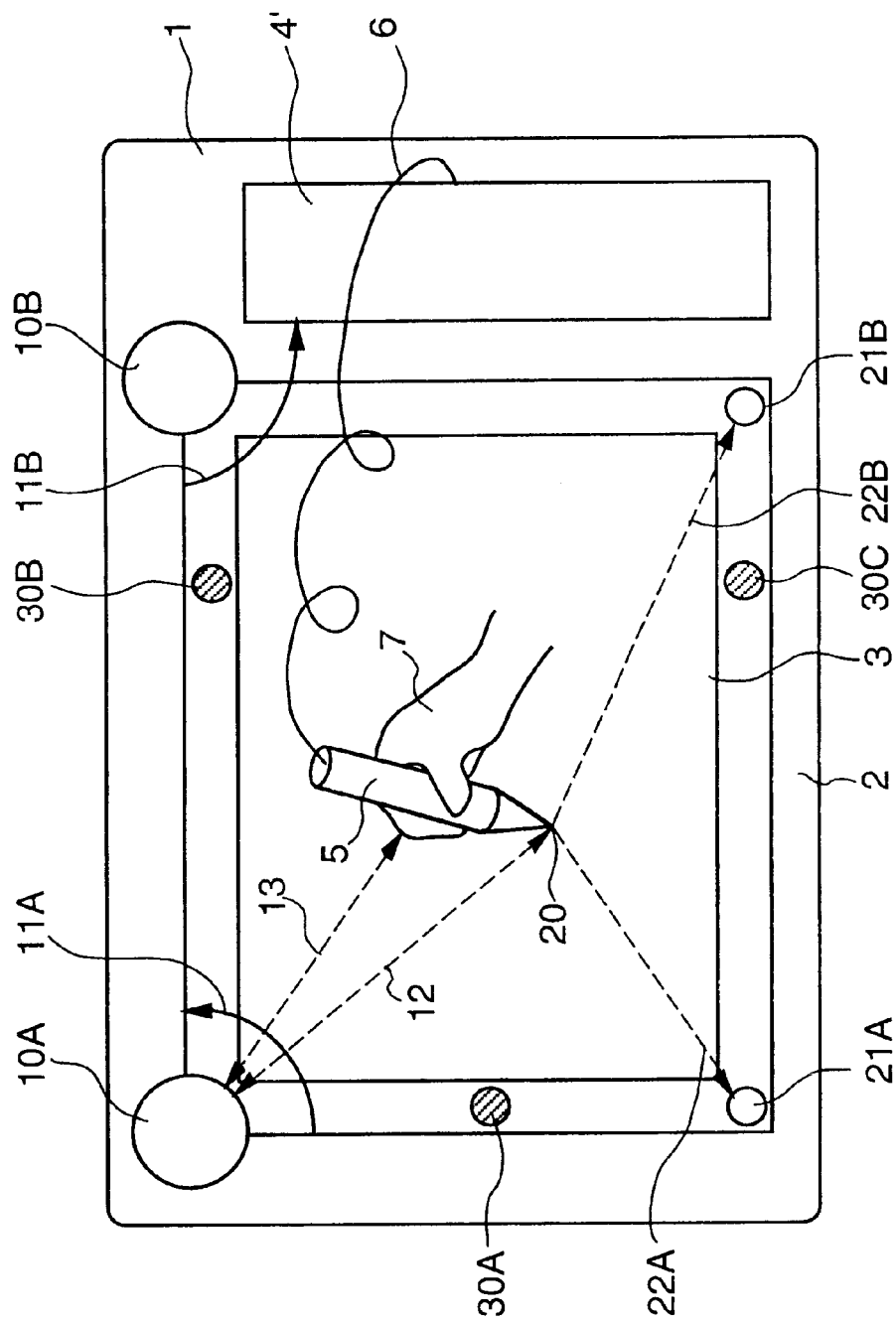
FIG. 5 is a schematic plan view showing the outer appearance of a coordinate input apparatus according to the second embodiment of the present invention.

FIG. 5 shows the outer appearance of a coordinate input apparatus according to the second embodiment. In FIG. 5, reference numerals 30A, 30B, and 30C denote pressure sensors, each of which extracts a voltage output generated by a piezoelectric element in accordance with the pressure acting on an input board 2 via an amplifier. Reference numeral 4' denotes a control circuit which comprises the arrangement shown in FIG. 6, as will be described later. Other portions are the same as those in the first embodiment, and a detailed description thereof will be omitted.

As the pressure sensor, various sensors such as a sensor using rubber dispersed with conductive particles, maybe used in addition to a sensor using a piezoelectric element, and can be applied to this embodiment. In the following description, a sensor using a piezoelectric element will be exemplified.

Figure 6:
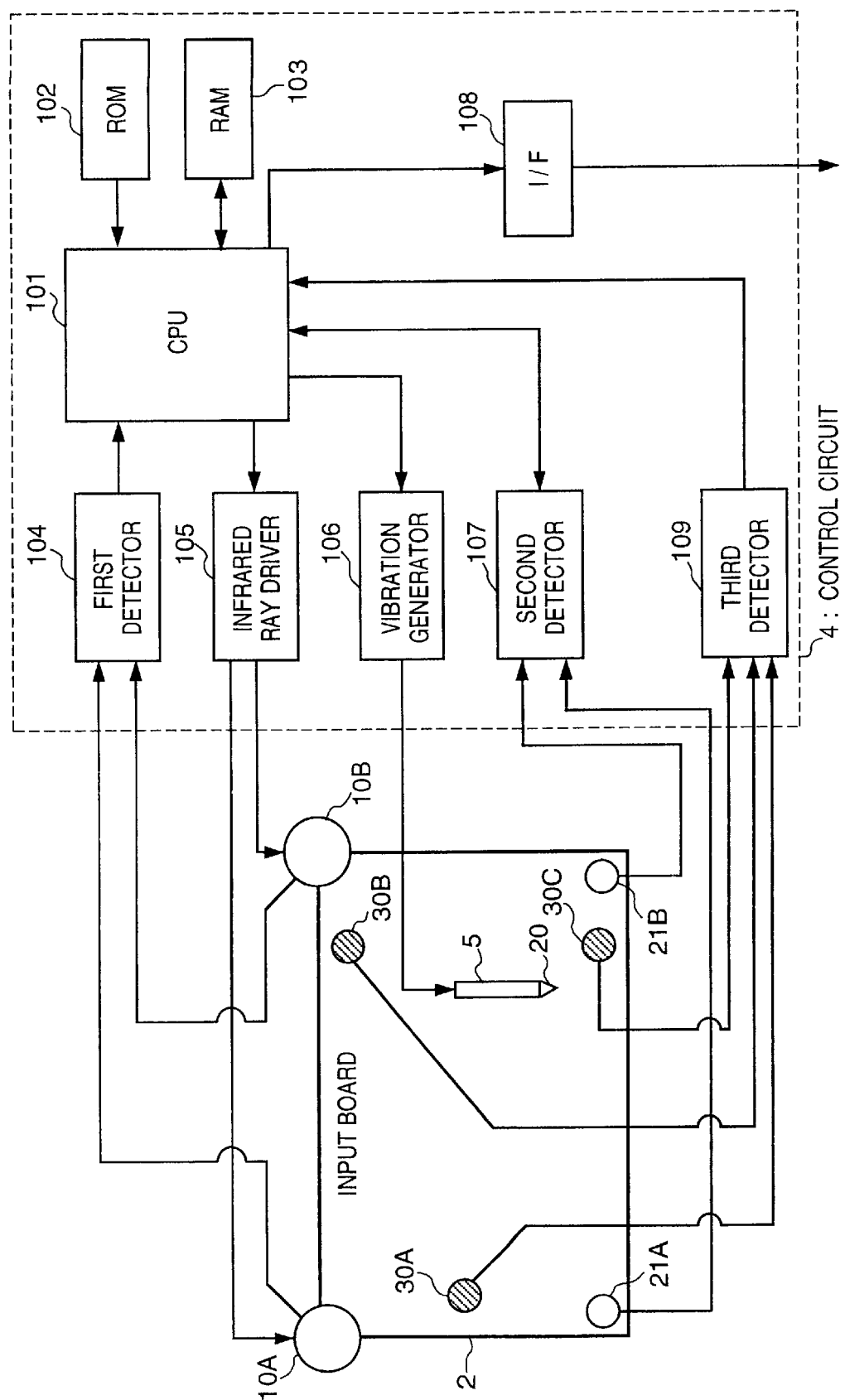
FIG. 6 is a block diagram showing the arrangement of a control circuit according to the second embodiment.

FIG. 6 is a block diagram showing the arrangement of the control circuit of the second embodiment. In FIG. 6, reference numeral 109 denotes a third detector which detects the pressure acting on the input board 2 on the basis of the signals from the pressure sensors 30A to 30C, and outputs a detection signal to a CPU 101.

Figure 7:
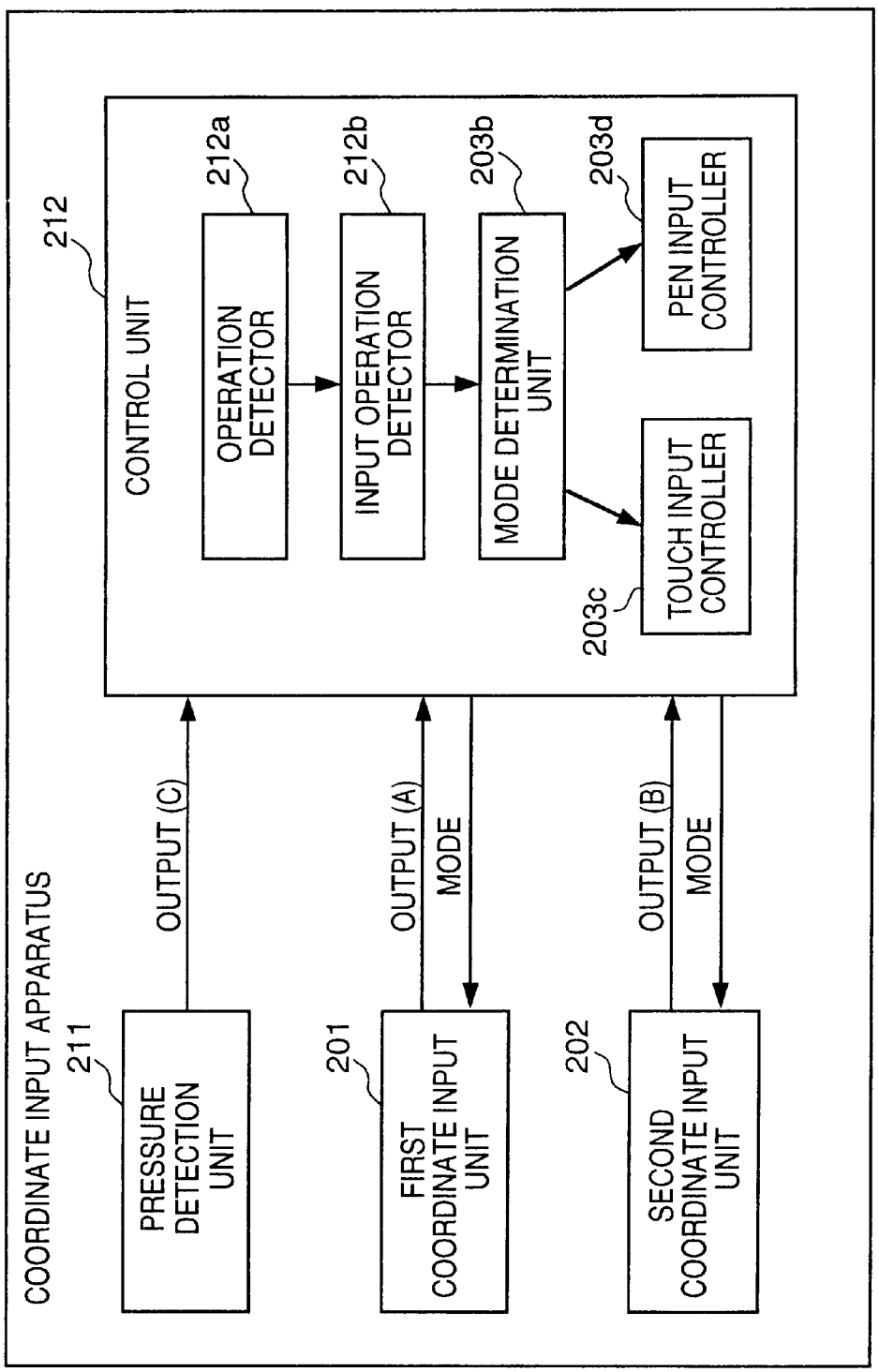
FIG. 7 is a block diagram for explaining the functional arrangement of the coordinate input apparatus according to the second embodiment.

FIG. 7 is a block diagram for explaining the functional arrangement of the coordinate input apparatus of the second embodiment. The same reference numerals in FIG. 7 denote the same functional components as those in the first embodiment (FIG. 3), and a detailed description thereof will be omitted. Reference numeral 211 denotes a pressure detection unit which is constituted by the above-mentioned pressure sensors 30A to 30C and third detector 109. A control unit 212 comprises an operation detector 212a in addition to the arrangement of the first embodiment. The operation detector 212a detects the presence/absence of coordinate input operation on the input board 2 on the basis of a pressure detection signal C from the pressure detection unit 211. Upon detecting coordinate input operation, the detector 212a informs an input operation detector 212b of the detection. The input operation detector 212b has the same function as that of the input operation detector 203a of the first embodiment, and also has a function of setting the standby mode of touch input upon receiving a detection message of coordinate input operation from the operation detector 212a. More specifically, a first coordinate input unit 201 is kept in the OFF mode until the operation detector detects coordinate input operation.

FIG. 8 is a flow chart for explaining the operation sequence of the coordinate input apparatus of the second embodiment.

In the state wherein no object touches the input board 3, the pressure sensors 30A to 30C are in operation. More specifically, the pressure detection unit 211 is set in the ON mode, and both the first coordinate input unit 201 and a second coordinate input unit 202 are set in the OFF mode (step S201). In this state, when the operator presses an input area 2 with the finger or places a hand 7 with a pen on the input area 3, the pressure sensors 30A to 30C output a detection signal C having a magnitude corresponding to the pressure. If the detection signal C is larger than a predetermined value C0, the flow advances from step S202 to step S203 to execute coordinate input processing.

In step S203, the input operation detector 212b is activated to set the pressure detection unit 211 in the OFF mode, and the first coordinate input unit 201 in the standby mode (the second coordinate input unit 202 is kept in the OFF mode). As a consequence, the same state as in step S101 (FIG. 4) in the first embodiment above is set, and the optical scanning/detection unit 10A detects the size of an approaching object.

For example, when the operator places the hand 7 with the pen 5 on the input area 3, the pressure sensors output a signal C with a magnitude corresponding to that pressure. When the signal C becomes larger than the predetermined value C0, the pressure sensors are set in the OFF mode, and the first coordinate input unit 201 is switched to the standby mode. The first coordinate input unit 201 then outputs a signal A corresponding to the size of the object which is applying the pressure.

Since the subsequent operations (steps S103 to S109 in FIG. 8) are the same as those in the first embodiment, a detailed description thereof will be omitted. If no approaching object has been detected for a predetermined time (T1), the flow returns from step S109 to step S201.

As described above, the pressure detection unit 211 and the operation detector 212a are arranged, and when the pressure detection value output from the pressure sensors 30A to 30C has exceeded a predetermined value, the apparatus is switched to the active state as in the first embodiment. For this reason, the first and second coordinate input units 201 and 202 can be set in the OFF mode until the pressure detection unit 211 and the operation detector 212*a* detect pressure. Hence, power savings can be achieved more effectively when there is no input.

The first coordinate input unit 201 is not switched to the standby mode unless a pressure exceeding the predetermined value acts on the input board 2. Hence, even when the operator moves an original close to the input surface, the coordinate input processing is not started by that pressure, and operation errors can be prevented. Even when the original is strongly pressed against the input board, since pen input is set in the ON mode as in the first embodiment, any wrong coordinate value can be prevented from being output.

As described above, according to the second embodiment, since the pressure sensors are used, the control can wait for input while setting the first coordinate input unit 201 not in the standby mode but in the OFF mode. Especially, an apparatus with a large-size input surface normally requires large consumption power in the standby mode even if it is of optical type or other types. That is, as the input surface becomes larger, the object to be detected may be present at a farther position. Hence, light with higher intensity must be used accordingly to obtain the same amount of reflected light. By contrast, the pressure sensors need only be arranged at several support portions that can detect the pressure acting on the input surface, and require little electric power if piezoelectric elements are used. Even if an original or the like approaches, the apparatus does not operate at all as long as the pressure sensors respond. Even when the original is strongly pressed against the input surface, it is not processed as touch input as in the first embodiment, thus preventing any operation errors.

In the first and second embodiments, parameters (T1, A0, A1, C0) used in the control unit (203, 212) may be fixed values or may be adjustable. This adjustment function may be realized by, e.g., volumes or the like, or by externally writing the parameters in a memory arranged in the control unit. In either case, the operator can change them desirably.

As described above, according to each of the above embodiments, a low-resolution touch input unit which detects an object which approaches or contacts the coordinate input board 2 and detects its position, and a high-resolution pen input unit (neither a simple contact nor proximity input unit) which detects a coordinate point by applying vibrations to the coordinate input board 2 are arranged. By adequately detecting the input form of the operator, one of the two different types of input modes is selected. Hence, the operability in the coordinate input apparatus capable of both touch and pen inputs can be improved, and operation errors can be remarkably reduced. In the standby state, since the touch input mechanism is driven in the state that requires less consumption power, power savings can be achieved.

Note that the present invention may be applied to either a system constituted by a plurality of equipments (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

As described above, according to the present invention, a coordinate input apparatus which can meet requirements for both touch and pen inputs, or its control method can be obtained.

According to the present invention, both touch input that allows light input operation, and pen input that allows precise input operation can be attained, and stable touch and pen inputs can be made.

According to the present invention, both touch and pen inputs can be satisfactorily made, and power savings can be achieved.

As many apparently widely different embodiments of the present invention can be made without departing from the spirit and scope thereof, it is to be understood that the invention is not limited to the specific embodiments thereof except as defined in the appended claims.

What is claimed is:

1. A coordinate input apparatus comprising:
   first position detection means for detecting a position pointed on an input surface at a first resolution;
   second position detection means for detecting the position pointed on the input surface at a second resolution higher than the first resolution;
   size detection means for detecting a size of an object that approaches or contacts the input surface; and
   control means for setting one of said first and second position detection means in an active state capable of pointed position detection on the basis of the size of the object detected by said size detection means,
   wherein when the size of the object detected by said size detection means is smaller than a predetermined value, said control means sets said first position detection means in the active stage capable of pointed position detection, and when the size of the object is not less than the predetermined value, said control means sets said second position detection means in the active state capable of pointed position detection.

2. The apparatus according to claim 1, wherein when the size of the object detected by said size detection means is larger than a first predetermined value and smaller than a second predetermined value, said control means sets said first position detection means in the active state capable of pointed position detection, and when the size of the object is not less than the second predetermined value, said control means sets said second position detection means in the active state capable of pointed position detection.

3. The apparatus according to claim 1, wherein said size detection means sets said first position detection means in an active state capable of size detection, and detects the size of the object that approaches or contacts the input surface.

4. The apparatus according to claim 3, wherein in the active state capable of size detection in said size detection means, some components of said first position detection means are activated.

5. The apparatus according to claim 3, wherein the active state capable of size detection of said first position detection means in said size detection means requires smaller consumption power than the active state capable of pointed position detection of said first position detection means.

6. The apparatus according to claim 1, wherein said first position detection means detects the pointed position based on light beams scanned by first and second detectors, and
said size detection means detects the size of the object that approaches or contacts the input surface based on the light beam scanned by one of said first and second detectors.

7. The apparatus according to claim 6, wherein a light scanning period of one of said first and second detectors in said size detection means is longer than a light scanning period in the active state capable of pointed position detection.

8. The apparatus according to claim 1, wherein said second position detection means detects the pointed position by an ultrasonic wave method.

9. The apparatus according to claim 1, further comprising:
pressure detection means for detecting a contact pressure acting on the input surface, and
wherein said size detection means detects the size of the object on the input surface when the contact pressure detected by said pressure detection means is higher than a predetermined pressure.

10. The apparatus according to claim 9, wherein said first and second position detection means are set in an inactive state until said pressure detection means detects a pressure exceeding the predetermined pressure, and
said size detection means sets components of said first position detection means in an active state capable of size detection, and detects the size of the object that approaches or contacts the input surface.

11. A coordinate input apparatus comprising:
first position detection means for detecting a position pointed on an input surface at a first resolution;
second position detection means for detecting the position pointed on the input surface at a second resolution different from the first resolution;
first size detection means for detecting a size of an object that approaches or contacts the input surface in a standby state in which at least one of said first and second position detection means is set in an inactive state;
first control means for switching said apparatus from the standby state to a coordinate input state on the basis of the size of the object detected by said first size detection means;
second size detection means for detecting a size of an object that approaches or contacts the input surface in the coordinate input state;
second control means for switching one of said first and second position detection means to an active state capable of pointed position detection on the basis of the size of the object detected by said second size detection means; and
third control means for controlling switching from the coordinate input state to the standby state of said apparatus on the basis of the size of the object detected by said second size detect ion means,
wherein said first control means switches said apparatus to the coordinate input state when the size of the object detected by said first size detection means is larger than a first predetermined value,
said second control means determines one of said first and second position detection means to be activated on the basis of whether or not the size of the object detected by said second size detection means is larger than a second predetermined value, and
said third control means switches said apparatus from the coordinate input state to the standby state when the size of the object detected by said second size detection means is smaller than the first predetermined value.

12. The apparatus according to claim 11, wherein said first position detection means can be activated in a size detection mode capable of size detection, and a position detection mode capable of detection of both the pointed position and size, and requires smaller consumption power in the size detection mode than in the position detection mode,
said first size detection means performs size detection by activating said first position detection means in the size detection mode, and
said second size detection means performs size detection while said first position detection means is activated in one of the size detection mode and position detection mode.

13. The apparatus according to claim 11, further comprising:
pressure detection means for detecting a contact pressure acting on the input surface while setting said first and second position detection means in a halt state, and
wherein said first size detection means starts detection of the size of the object on the input surface when the contact pressure detected by said pressure detection means is higher than a predetermined pressure.

14. A control method for a coordinate input apparatus which comprises first position detection means for detecting a position pointed on an input surface at a first resolution, and second position detection means for detecting the position pointed on the input surface at a second resolution higher than the first resolution, comprising:
the size detection step of detecting a size of an object that approaches or contacts the input surface; and
the control step of setting one of said first and second position detection means in an active state capable of pointed position detection on the basis of the size of the object detected in the size detection step,
wherein said control step includes the steps of setting said first position detection means in the active state capable of pointed position detection when the size of the object detected in the size detection step is smaller than a predetermined value, and setting said second position detection means in the active state capable of pointed position detection when the size of the object is not less than the predetermined value.

15. The method according to claim 14, wherein the control step includes the steps of setting said first position detection means in the active state capable of pointed position detection when the size of the object detected in the size detection step is larger than a first predetermined value and smaller than a second predetermined value, and setting said second position detection means in the active state capable of pointed position detection when the size of the object is not less than the second predetermined value.

16. The method according to claim 14, wherein the size detection step includes the step of setting said first position detection means in an active state capable of size detection, so as to detect the size of the object that approaches or contacts the input surface.

17. The method according to claim 16, wherein in the active state capable of size detection in the size detection step, some components of said first position detection means are activated.

18. The method according to claim 16, wherein the active state capable of size detection of said first position detection means in the size detection step requires smaller power consumption than the active state capable of pointed position detection of said first position detection means.

19. The method according to claim 14, wherein said first position detection means detects the pointed position based on light beams scanned by first and second detectors, and the size detection step includes the step of detecting the size of the object that approaches or contacts the input surface based on the light beam scanned by one of said first and second detectors.

20. The method according to claim 19, wherein a light scanning period of one of said first and second detectors in the size detection step is longer than a light scanning period in the active state capable of pointed position detection.

21. The method according to claim 14, wherein said second position detection means detects the pointed position by an ultrasonic wave method.

22. The method according to claim 14, further comprising:

the pressure detection step of detecting a contact pressure acting on the input surface, and wherein the size detection step includes the step of detecting the size of the object on the input surface when the contact pressure detected in the pressure detection step is higher than a predetermined pressure.

23. The method according to claim 22, wherein the size detection step includes the steps of setting said first and second position detection means in an inactive state until a pressure exceeding the predetermined pressure is detected in the pressure detection step, and setting components of said first position detection means in an active state capable of size detection, so as to detect the size of the object that approaches or contacts the input surface.

24. A control method for a coordinate input apparatus which comprises first position detection means for detecting a position pointed on an input surface at a first resolution, and second position detection means for detecting the position pointed on the input surface at a second resolution different from the first resolution, comprising:

the first size detection step of detecting a size of an object that approaches or contacts the input surface in a standby state in which at least one of said first and second position detection means is set in an inactive state;

the first control step of switching said apparatus from the standby state to a coordinate input state on the basis of the size of the object detected in the first size detection step;

the second size detection step of detecting a size of an object that approaches or contacts the input surface in the coordinate input state;

the second control step of switching one of said first and second position detection means to an active state capable of pointed position detection on the basis of the size of the object detected in the second size detection step; and the third control step of controlling switching from the coordinate input state to the standby state of said apparatus on the basis of the size of the object detected in the second size detection steps wherein the first control step includes the step of switching said apparatus to the coordinate input apparatus when the size of the object detected in the first size detection step is larger than a first predetermined value, the second control step includes the step of determining one of said first and second position detection means to be activated on the basis of whether or not the size of the object detected in the second sized detection step is larger than a second predetermined value, and the third control step includes the step of switching said apparatus from the coordinate input state to the standby state when the size of the object detected in the second size detection step is smaller than the first predetermined value.

25. The method according to claim 24, wherein said first position detection means can be activated in a size detection mode capable of size detection, and a position detection mode capable of detection of both the pointed position and size, and requires smaller power consumption in the size detection mode than in the position detection mode, the first size detection step includes the step of performing size detection by activating said first position detection means in the size detection mode, and the second size detection step includes the step of performing size detection while said first position detection means is activated in one of the size detection mode and position detection mode.

26. The method according to claim 24, further comprising:

the pressure detection step of detecting a contact pressure acting on the input surface while setting said first and second position detection means in a halt state, and wherein the first size detection step includes the step of starting detection of the size of the object on the input surface when the contact pressure detected in the pressure detection step is higher than a predetermined pressure.

27. A computer readable memory that stores a control program for a coordinate input apparatus which comprises first position detection means for detecting a position pointed on an input surface at a first resolution, and second position detection means for detecting the position pointed on the input surface at a second resolution higher than the first resolution, said program comprising:

a program code of size detection processing for detecting a size of an object that approaches or contacts the input surface; and a program code of control processing for setting one of said first and second position detection means in an active state capable of pointed position detection on the basis of the size of the object detected in the size detection processing, wherein said program code of control processing includes a program code for setting said first position detection means in the active state capable of pointed position detection when the size of the object detected by said program code of size detection is smaller than a predetermined value, and setting said second position detection means in the active state capable of pointed position detection when the size of the object is not less than the predetermined value.

28. The memory according to claim 27, further comprising:

a program code of pressure detection processing for detecting a contact pressure acting on the input surface, and wherein the size detection processing starts detection of the size of the object on the input surface when the contact pressure detected in the pressure detection processing is higher than a predetermined pressure.

29. The memory of claim 28, wherein the size detection processing includes setting said first and second position detection means in an inactive state until a pressure exceeding the predetermined pressure is detected in the pressure detection processing, and setting components of said first position detection means in an active state capable of size detection, so as to detect the size of the object that approaches or contacts the input surface.

30. The memory according to claim 27, wherein the control processing includes setting said first position detection means in the active state capable of pointed position detection when the size of the objected detected in the size detection processing is larger than a first predetermined value and smaller than a second predetermined value, and setting said second position detection means in the active state capable of pointed position detection when the size of the object is not less than the second predetermined value.

31. The memory according to claim 27, wherein the size detection processing includes setting said first detection means in an active state capable of size detection, so as to detect the size of the object that approaches or contacts the input surface.

32. The memory according to claim 31, wherein in the active state capable of size detection in the size detection processing, some components of said first position detection means are activated.

33. The memory according to claim 31, wherein the active state capable of size detection of said first position detection means in the size detection processing requires smaller power consumption than the active state capable of pointed position detection of said first position detection means.

34. The memory of claim 27, wherein said first position detection means detects the pointed position based on light beams scanned by first and second detectors, and the size detection processing includes detecting the size of the object that approaches or contacts the input surface based on the light beam scanned by one of said first and second detectors.

35. The memory of claim 34, wherein a light scanning period of one of said first and second detectors in the size detection processing is longer than a light scanning period in the active state capable of pointed position detection.

36. The memory of claim 27, wherein said second position detection means detects the pointed position by an ultrasonic wave method.

37. A computer readable memory that stores a control program for a coordinate input apparatus which comprises first position detection means for detecting a position pointed on an input surface at a first resolution, and second position detection means for detecting the position pointed on the input surface at a second resolution different from the first resolution, said program comprising:

a program code of first size detection processing for detecting a size of an object that approaches or contacts the input surface in a standby state in which at least one of said first and second position detection means is set in an inactive state;

a program code of first control processing for switching said apparatus from the standby state to a coordinate input state on the basis of the size of the object detected in the first size detection processing;

a program code of second size detection processing for detecting a size of an object that approaches or contacts the input surface in the coordinate input state;

a program code of second control processing for switching one of said first and second position detection means to an active state capable of pointed position detection on the basis of the size of the objected detected in the second size detection processing; and a program code of third control processing for controlling switching from the coordinate input state to the standby state of said apparatus on the basis of the size of the object detected in the second size detection processing, wherein the first control processing includes the step of switching said apparatus to the coordinate input apparatus when the size of the objected detected in the first size detection processing is larger than a first predetermined value, the second control processing includes the step of determining one of said first and second position detection means to be activated on the basis of whether or not the size of the object detected in the second size detection processing is larger than a second predetermined value, and the third control processing includes the step of switching said apparatus from the coordinate input state to the standby state when the size of the object detected in the second size detection processing is smaller than the first predetermined value.

38. The method of claim 37, wherein said first position detection means can be activated in a size detection mode capable of size detection, and a position detection mode capable of detection of both the pointed position and size, and requires smaller power consumption in the size detection mode than in the position detection mode, the first size detection processing includes performing size detection by activating said first position detection means in the size detection mode, and the second size detection processing includes performing size detection while said first position detecting means is activated in one of the size detection mode and position detection mode.

39. The method of claim 37, further comprising a program code of pressure detection processing for detecting a contact pressure acting on the input surface while setting said first and second position detection means in a halt state, wherein the first size detection processing includes starting detection of the size of the object on the input surface when the contact pressure detected in the pressure detection processing is higher than a predetermined pressure.

* * * * *

UNITED STATES PATENT AND TRADEMARK OFFICE
CERTIFICATE OF CORRECTION

PATENT NO. : 6,208,330 B1
DATED : March 27, 2001
INVENTOR(S) : Masahide Hasegawa et al.

Page 1 of 1

It is certified that error appears in the above-identified patent and that said Letters Patent is hereby corrected as shown below:

Column 7,
Line 36, "byultrasonic" should read -- by ultrasonic --.

Column 11,
Line 67, "detect ion" should read -- detection --.

Column 15,
Line 19, "objected" should read -- object --.

Column 16,
Lines 15 and 23, "objected" should read -- object --.

Signed and Sealed this

Twenty-second Day of January, 2002

Attest:

*Attesting Officer*

JAMES E. ROGAN
*Director of the United States Patent and Trademark Office*